United States Patent
Kawada

[15] 3,689,781
[45] Sept. 5, 1972

[54] VOLTAGE TRANSFORMING DEVICES UTILIZING PIEZOELECTRIC ELEMENTS

[72] Inventor: Takehiko Kawada, Yokohama, Japan

[73] Assignee: Denki Onkyo Company, Limited, Tokyo, Japan

[22] Filed: Nov. 20, 1970

[21] Appl. No.: 91,482

[30] Foreign Application Priority Data

Nov. 22, 1969 Japan..................44/93806

[52] U.S. Cl. ..................310/8.1, 310/8.2, 310/9.8, 331/163
[51] Int. Cl. ..................................H01v 7/00
[58] Field of Search ..................310/8.1–8.3, 9.5–9.8; 331/163, 116

[56] References Cited

UNITED STATES PATENTS

| | | | |
|---|---|---|---|
| 3,562,792 | 2/1971 | Berlincourt et al. | 310/9.8 X |
| 3,302,131 | 1/1967 | Pyatt | 310/8.3 X |
| 3,441,753 | 4/1969 | Terayama | 310/8.2 |
| 3,432,691 | 3/1969 | Shoh | 310/8.1 |
| 2,975,354 | 3/1961 | Rosen | 310/8.1 X |
| 3,421,109 | 1/1969 | Wiggins et al. | 310/9.8 X |
| 3,371,233 | 2/1968 | Cook | 310/8.1 |
| 3,518,573 | 6/1970 | Smith | 310/9.8 X |

Primary Examiner—J. V. Truhe
Assistant Examiner—B. A. Reynolds
Attorney—Chittick, Pfund, Birch, Samuels & Gauthier

[57] ABSTRACT

In a voltage transforming device comprising a piezoelectric element having a pair of driving electrodes applied to the opposite sides of the driving region and an output electrode applied to the end surface of the generating region and a driving source for applying a driving voltage across the driving electrodes, a feedback electrode is provided near one of the driving electrodes and the voltage derived from the feedback electrode and proportional to the displacement amplitude of the vibuation of the piezoelectric element is fed back to the driving source to cause it to oscillate at the frequency of the mechanical vibration of the element.

4 Claims, 5 Drawing Figures

PATENTED SEP 5 1972 3,689,781
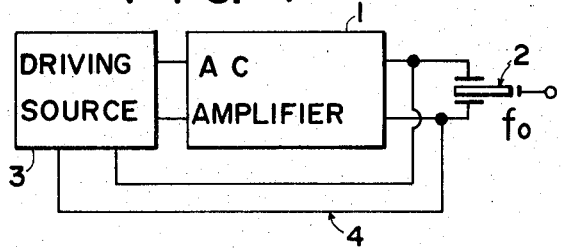
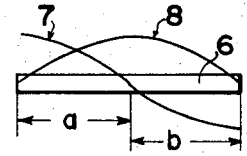
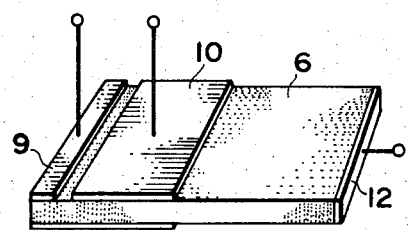
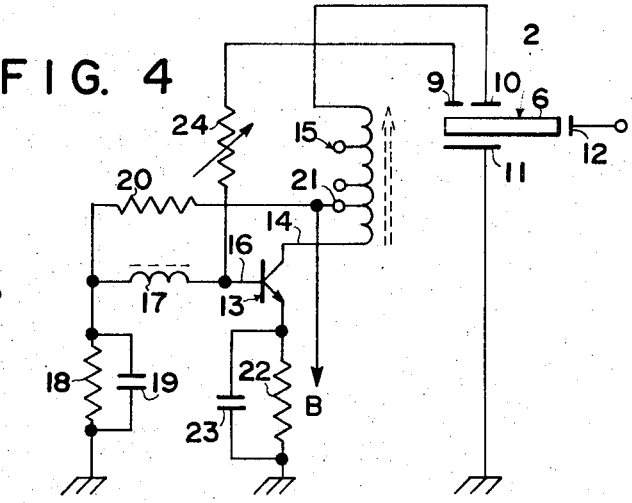
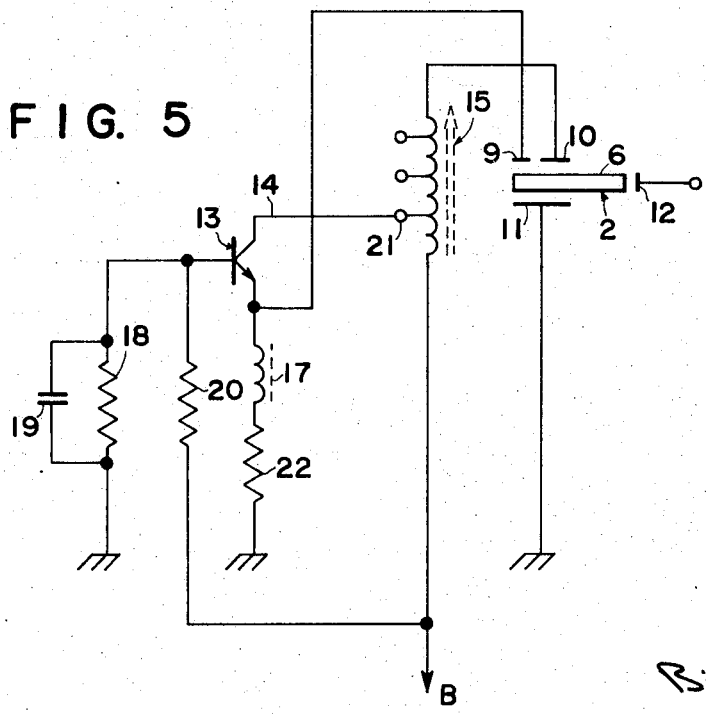
INVENTOR.
TAKEHIKO KAWADA
BY Chittick Pfund,
Birch, Samuels & Gauthier 3,689,781

VOLTAGE TRANSFORMING DEVICES UTILIZING PIEZOELECTRIC ELEMENTS

BACKGROUND OF THE INVENTION

This invention relates to a novel piezoelectric element and a voltage transforming device utilizing the same.

The piezoelectric element is generally formed of lead zirconate type ceramic material, for example, and is especially suitable to convert low voltage into high voltage so that it is exclusively utilized as the piezoelectric transformer element of a piezoelectric voltage transforming device. As is well known in the art, the piezoelectric element can produce highest output voltage when it is driven by an AC voltage having the same frequency as the natural vibration frequency of the element. For this reason, to compensate for variations in the characteristics of various piezoelectric elements, a means is usually used to adjust the frequency of the driving source to match with the natural vibration frequency of respective elements. In view of the converting ability discribed above, it is possible to increase the amplitude of the natural vibration of the element by utilizing an oscillation circuit having the same frequency as the natural vibration of the element. However, as the natural frequency of the elements varies by an integer multiple it is difficult to determine the proper natural frequency when a particular element is associated with an oscillation system. In other words, a single frequency should be selected to drive the oscillation system, because unless a frequency selection circuit of high Q is connected to the load circuit, a number of harmonic oscillation frequencies are induced which produces instability of operation and decrease the efficiency thus causing oscillations which induce white noise.

SUMMARY OF THE INVENTION

Accordingly, it is an object of this invention to provide a novel piezoelectric element having an improved electrode construction capable of deriving a most stable and high power feedback voltage which is fed back to an oscillation system used to drive the piezoelectric element utilized for providing voltage transformation.

Another object of this invention is to provide a novel voltage transforming device wherein a piezoelectric element is employed as one element thereof, and a frequency required to vibrate the element is fed back through a feedback loop for automatically controlling the frequency of the driving source whereby to eliminate the necessity of adjusting the frequency of the driving source each time the resonance frequency of a given piezoelectric element is measured for connecting it to the driving source as has been the practice in the past.

Further object of this invention is to provide a novel voltage transforming device wherein a piezoelectric element is utilized as one element of the voltage transforming device and the driving voltage for the element is set to any desired value to produce a high output voltage corresponding to the driving voltage setting.

Still further object of this invention is to provide a novel voltage transforming device wherein a piezoelectric element is utilized as one element of the voltage transforming device and the impedance between the driving electrode of the element and the driving source is adjusted so as to produce a high voltage output of any desired frequency.

Briefly stated according to this invention there is provided a piezoelectric element made of ceramic and comprising a driving region, a generating region, a first driving section applied to one side of the driving region, a feedback electrode applied to the other side of the driving region near one end edge thereof, a second driving electrode applied to the other side of the driving region but spaced apart from the feedback electrode, and an output electrode applied to the end surface of the generating region.

The voltage transforming device of this invention comprises the piezoelectric element just described, and a driving source, preferably an oscillation transistor, connected to the driving electrodes of the piezoelectric element for applying a driving voltage across the driving electrodes and means to feed back the output from the feedback electrode which is proportional to the displacement amplitude of the mechanical vibration of the piezoelectric element to the driving source so as to control the oscillation frequency thereof to coincide with the frequency of the mechanical vibration of the piezoelectric element. When the driving source comprises an oscillation transistor the output from the feedback electrode is fed back to the base or emitter electrode of the transistor. By this means, the natural frequency of the mechanical vibration of the piezoelectric element is readily sensed and the element is driven at this frequency so as to operate most stably and at high efficiency.

BRIEF DESCRIPTION OF THE DRAWING

Further objects and advantages of the invention will become apparent from the following detailed description taken in conjunction with the accompanying drawing in which:

FIG. 1 shows a block diagram of the novel voltage transforming device utilizing a piezoelectric element;

FIG. 2 is a diagram to explain a vibration mode of a conventional piezoelectric element;

FIG. 3 is a perspective view of one example of the novel piezoelectric element;

FIG. 4 shows the connection diagram of one example of a voltage transforming device employing a piezoelectric element of this invention and FIG. 5 shows the connection diagram of a modified voltage transforming device employing the novel piezoelectric element.

DESCRIPTION OF THE PREFERED EMBODIMENTS

With reference to FIG. 1 of the accompanying drawing which shows a block diagram of the novel voltage transforming device, there are provided an AC amplifier 1 connected to a conventional piezoelectric element 2 having a resonance frequency of $f_o$ and a driving source 3. In accordance with this invention a voltage representing a condition under which the piezoelectric element 2 is operating most stably and at the highest efficiency is derived by a feedback loop 4 to utilize this feedback voltage for controlling the driving source 3, thus stabilizing the operation of the piezoelectric element.

Accordingly, it is essential to solve the problem of how to derive the most stable and largest oscillation component of voltage from the piezoelectric element 2 for applying the component to the feedback loop 4.

FIG. 2 is a diagram to explain the oscillation mode of one half wavelength of a piezoelectric element 6 from which the driving electrodes have been removed. As is well known in the art one half section a of the ceramic element 6 is usually termed the driving region whereas the other one half section b the generating region. When a driving voltage is applied across opposite surfaces of the driving region a the interface between sections a and b acts as the node of the displacement vibration wave, the displacement being shown by curve 7 in FIG. 7. The intensity of the strain of the element 6 is shown by a sinusoidal curve 8. As can be clearly noted from curves 7 and 8 since the displacement is the maximum at the ends of element 6, in order to stably derive the exact information of the vibration of the element, the voltage at the ends should be used as the feedback voltage.

According to this invention the driving electrode of the piezoelectric element is constructed by taking into consideration the vibration mode just described. One example of the electrode construction is illustrated by the perspective view shown in FIG. 3. As shown, a feedback electrode 9 is secured on the upper surface of the driving region of the element along one end edge thereof and a driving electrode 10 is secured on the same surface with a small gap between electrodes 9 and 10. On the lower side of the driving region is applied another driving electrode 11 fo cooperate with the driving electrode 10. As is well known in the art, a high voltage output electrode 12 is applied to the end surface of the generating region. According to this construction, as the electrode 9 is disposed as close as possible to the edge it is possible to derive out a voltage proportional to the maximum amplitude of the vibration mode curve 7, FIG. 2, through feedback electrode 9. However, it is to be understood that the position of electrode 9 is to be determined dependent upon the values of the feedback voltage and feedback current required as well as the mode of vibration of the element. Feedback electrode 9 and driving electrode 10 may be formed independently on the upper surface of the driving region by vapor deposition. Alternatively after applying a continuous electrode film on the upper surface of the driving region a portion of the electrode film may be removed in parallel with the end edge to provide independent electrodes 9 and 10.

FIG. 4 is a connection diagram of one example of the novel voltage transforming device utilizing the piezoelectric element described hereinabove. As shown, the collector electrode 14 of transistor 13 is connected to the driving electrode 10 of the piezoelectric element 2 through a high frequency transformer 15 whereas the other driving electrode 11 is grounded. The feedback electrode 9 of the element is connected to the base electrode 16 of transistor 13 through a variable resistor 24. The base electrode 16 is connected to the ground through an AC blocking reactor 17 and a parallel combination of a bias resistor 18 and a capacitor 19. The juncture between the AC blocking reactor 17 and the parallel combination is connected to one of intermediate taps 21 of the high frequency transformer 15 through a bias resistor 20, said one tap 21 being also connected to a source B. The emitter electrode of bias transistor 13 is grounded through another bias resistor 22 and a shunting capacitor 23. Bias resistors 18, 20 and 22 cooperate to determine the oscillation point of transistor 16.

In operation, upon application of the source voltage B upon the base electrode 16 of transistor 13 an AC voltage is impressed upon driving electrode 10 of piezoelectric element 2 through high frequency transformer 15. At this time, a maximum voltage proportional to the amplitude of displacement, FIG. 2, or the mechanical vibration of the element 2 will appear at the feedback electrode 9 thereof so that the voltage fed back to the base electrode 16 of transistor 13 will pass a current having the same frequency as the mechanical vibration frequency of the element whereby to increase the current until the current flowing through transistor 13 becomes saturated thus bringing the same into a stable operating condition. Under these conditions, the piezoelectric element 2 sustains its vibration to produce the maximum output voltage at its output electrode 12. By the suitable selection of the intermediate tap 21 of the high frequency transformer, it is possible to set the driving voltage of the piezoelectric element to any desired value whereas the inclusion of the variable resistor 24 between feedback electrode 9 and base electrode 16 permits control of the high voltage output.

Thus, this invention provides a novel voltage transforming device wherein a feedback electrode is provided for a piezoelectric element at a position to derive an output having a desired displacement amplitude and the voltage and the feedback electrode is fed back to an oscillation transistor to determine the most stable vibration frequency of the element and to cause the transistor to oscillate at said frequency. Moreover, according to this invention since the vibration mode of the piezoelectric element 2 is determined by the series resonance of an impedance matching circuit comprising the inductance determined by the ratio of the turns of a portion of the high frequency transformer between tap 21 and collector 14 and the turns of a portion between tap 21 and driving electrode 10, and the capacitance between two driving electrodes 10 and 11 of piezoelectric element 2 it is possible to produce the high voltage output of any desired frequency by varying the impedance of the impedance matching circuit. The sinusoidal output voltage appearing at output electrode 12 and having the resonance frequency that has been stepped up by a factor of several tens or more from the driving voltage impressed across driving electrodes 10 and 11 can be utilized directly or after rectification.

FIG. 5 shows another embodiment of the novel voltage transforming device of this invention. This embodiment is generally identical to that shown in FIG. 4 except that the voltage of the feedback electrode 9 is fed back to the emitter electrode of the oscillation transistor 13, whereby to use the same as an emitter follower with a unity current amplification factor. For this reason, it is not possible to apply a high driving voltage across driving electrodes 10 and 11 but the oscillation operation becomes more stable.

Although the invention has been shown and described in terms of preferred embodiments thereof it will be clear that many changes and modifications may

What is claimed is:

1. A voltage transforming device comprising an elongated piezoelectric transformer having a driving region, a generating region, a feedback electrode and a first driving electrode applied on one side of said driving region, a second driving electrode applied to the other side of said driving region, and a high voltage output electrode applied to the end surface of said generating region; an oscillation transistor with its base electrode connected to said feedback electrode; a high frequency inductive transformer having at least one intermediate tap connected between the collector electrode of said transistor and one of said driving electrodes for resonating with the capacitance of said driving electrodes at the vibration frequency of said piezoelectric transformer; means to connect an intermediate tap of said high frequency inductive transformer to the base electrode of said transistor; and a DC source connected to said tap and said base electrode, the output proportional to the displacement amplitude of said piezoelectric element derived from said feedback electrode being fed back to said base electrode to determine the most suitable vibration frequency of said piezoelectric transformer to cause said transistor to oscillate at said frequency.

2. The voltage transforming device according to claim 1 wherein said high frequency transformer is provided with a plurality of intermediate taps and wherein the connection between said base electrode and said taps is adapted to be changed to vary the driving voltage impressed across said driving electrodes by changing the impedance ratio of said inductive transformer.

3. The voltage transforming device according to claim 2 wherein a variable resistor is connected between said feedback electrode and said base electrode to control the valve of the high output voltage appearing at said output electrode of said piezoelectric element.

4. A voltage transforming device comprising an elongated piezoelectric element having a driving region, a generating region, a feedback electrode and a first driving electrode applied on one side of said driving region, a second driving electrode applied to the other side of said driving region, and a high voltage output electrode applied to the end surface of said generating region; an oscillation transistor with its emitter electrode connected to said feedback electrode; a high frequency inductive transformer connected between one of said driving electrodes and the base electrode of said transistor for resonating with the capacitance of said driving electrodes at the vibration frequency of said piezoelectric transformer, said high frequency transformer being provided with a plurality of intermediate taps, means to selectively connect one of said intermediate taps to the collector electrode of said transistor, means to connect one end of said high frequency inductive transformer to the base electrode of said transistor and a DC source connected to said one end of said high frequency inductive transformer and said base electrode, the output proportional to the displacement amplitude of said piezoelectric element appearing at said feedback electrode being fed back to said emitter to determine the most stable vibration frequency of said piezoelectric element thus causing said transistor to oscillate at said frequency.

* * * * *